United States Patent [19]

Klein et al.

[11] Patent Number: 4,663,248
[45] Date of Patent: May 5, 1987

[54] ELECTRODE TERMINAL CONTACT

[75] Inventors: Gerhart Klein, Manchester; Francis Gurrie, Ipswich, both of Mass.; Joseph Barella, Irvington, N.Y.

[73] Assignee: Duracell Inc., Bethel, Conn.

[21] Appl. No.: 415,208

[22] Filed: Sep. 7, 1982

[51] Int. Cl.4 .............................................. H07M 2/02
[52] U.S. Cl. ................................. 429/169; 429/170; 429/172; 429/181
[58] Field of Search .............. 429/164, 165, 172, 174, 429/101, 105, 196, 178, 181, 185, 169, 166–171, 94

[56] References Cited

U.S. PATENT DOCUMENTS

| 2,712,034 | 6/1955 | Seavey et al. | 429/167 |
| 2,773,926 | 12/1956 | Glover | 429/167 |
| 3,066,179 | 11/1962 | Ruben | 429/169 X |
| 3,849,868 | 11/1974 | Jost | 429/167 X |
| 3,888,700 | 6/1975 | Larsen | 429/166 |
| 3,891,463 | 6/1975 | Karobath et al. | 429/167 X |
| 4,052,537 | 10/1977 | Mallory | 429/174 |
| 4,184,012 | 1/1980 | Barella | 429/178 X |

Primary Examiner—Brian E. Hearn
Assistant Examiner—Stephen J. Kalafut
Attorney, Agent, or Firm—Ronald S. Cornell

[57] ABSTRACT

Terminal contact is made between an electrode in an electrochemical cell and the external terminal therefor by capture of an electrically conductive portion of said electrode within or by a member of a compressively formed seal of the cell.

7 Claims, 5 Drawing Figures

ELECTRODE TERMINAL CONTACT

This invention relates to terminal contacts between electrodes and terminals therefor and particularly for spirally wound electrodes in non-aqueous aerosol type cell containers.

Terminal contact between an electrode and the portion of the cell container which is to function as the terminal therefor, particularly in non-aqueous cells has generally been accomplished by several well recognized methods, the most common of which is by welding of the electrode directly to the terminal or via an intermediary electrically conductive tab or wire. Another common method is by direct compressive contact between the electrode material and a portion of the metal cell container and in the case of certain metal electrodes such as lithium the forces used to effect such compressive contact actually result in a cold weld. In cells having spirally wound configuration such compressive contact is difficult to reliably achieve and accordingly weld connections have been utilized in such cells for reliability. However, such welding for terminal connections requires additional manufacturing steps thereby increasing costs. Furthermore, weld sites are particularly prone to detrimental corrosion.

It is an object of the present invention to provide a method for providing an economical and reliable electrode-terminal connection in a compressively sealed cell and the cell so made.

It is a further object of the present invention to provide such method in the construction of non-aqueous electrochemical cells in an aerosol type structure and having a spirally wound electrode structure.

These and other objects, features and advantages of the present invention will become more evident from the following discussion and the drawings (illustrative and not to scale) in which.

Generally, the present invention comprises a method for mechanically effecting a reliable electrode to terminal electrical connection in an electrochemical cell, without the necessity of welding and the cell having such electrical connection. The electrode, particularly the cathode, which usually presents greater difficulty in making welding connections, is initially sized and cut or alternatively made initially larger such that a portion thereof extends beyond the generally spirally wound electrode structure. The electrode is either metallic or contains a metallic substrate which is electrically conductive and such extension is similarly metallic or metal containing in order to effect the requisite terminal connection of the present invention. The extension of the electrode is positioned such that when the electrode structure is placed within the generally cylindrical cell container prior to sealing, the extension is proximate with the open end of the cell container or sealing area. The extension is further positioned such that upon the inward (such as an aerosol type seal) curling of the cell container end said extension is caught and compressively held between the curled end and the container wall to effect a positive electrical connection between the electrode and the container. When the container is sealed by the positioning and crimping of a top member on the curled end the electrical connection is further mechanically reinforced. In an alternative but less preferred embodiment the electrode extension is caught between the curled end and the cell top member. Care must however be taken that the electrode extension (such as those having expanded metal substrates therein) not perforate the insulation between the curled end and the top member and that the electrode extension does not substantially affect the integrity of the seal between the curled end and top member. Since the present invention requires that the container end be curled inwardly to effect the requisite terminal connection it is of particular applicability in cell containers of the aerosol type configuration as shown in U.S. Pat. Nos. 4,136,438 and 4,052,537 which are specifically constructed with such inwardly curled ends. Though it is preferred that the extension be integral with the electrode for simplicity, such extension may also be an initially separate element attached to the electrode.

Figure 1:
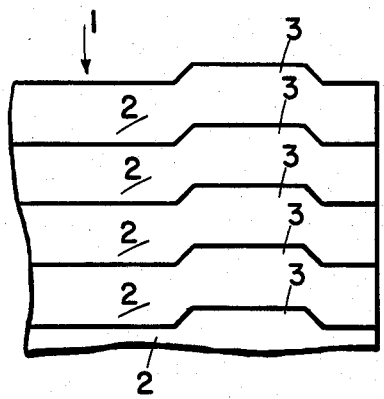
FIG. 1 depicts a preferred method for cutting electrodes in a shape suitable for use in the present invention.

With specific reference to the drawings, FIG. 1 depicts a cathode master roll 1 which is slit into cathode strips 2 for use in a spirally wound cell configuration. Each of the cathode strips 2 includes an integral extension or jog 3 which is located at a predetermined position near the outer end (when wound) of the cathode strip 2. The slitting of the cathode master roll 1 in this manner provides the integral extension 3 without the necessity for additional steps and further minimizes waste.

Each cathode strip 2 is comprised of a compressed powder (cathode active e.g. $MnO_2$ or inactive e.g. carbon or graphite) depending on the particular cell system) on a metal substrate such as of expanded metal. The extension 3 may either have the powder retained thereon or have it removed to expose the expanded metal substrate which provides the requisite electrically conductive connection.

The length of jog 3 may be the length of the cathode but is preferably predetermined as being less than the circumference of the cell container end prior to sealing, in order to avoid overlap of the jog 3 on itself whereby mechanical contact may be affected. More preferably, since jog 3, in the slitting configuration shown, causes some loss in cathode capacity it is preferably further minimized in length with about one third of the circumference providing good mechanical contact with minimal capacity loss. The height of jog 3 is similarly predetermined relative to the cell container end whereby it is situated adjacent and preferably slightlyb below said end when the electrode is placed in the cell container prior to sealing.

Figure 2:
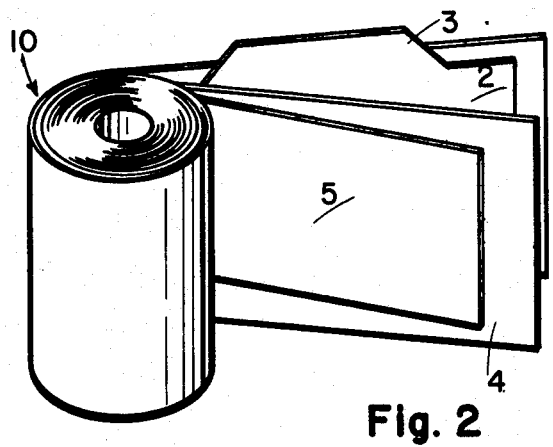
FIG. 2 is an isometric view during the winding of the cell electrodes including the cut electrodes shown in FIG. 1, into a spirally wound structure.

After slitting, the cathode strips 2 are spirally wound into the "jelly roll" cell electrode structure configuration 10 shown in FIG. 2 with layers of separator material 4 and anode material 5 such as of lithium with jog 3 extending beyond the "jelly roll" structure.

Figure 3:
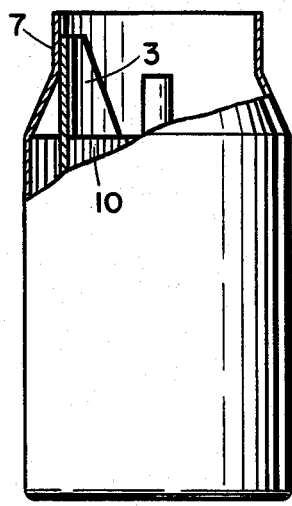
FIG. 3 is a sectioned elevation view of a cell container having the spirally wound cell structure therein prior to sealing of the cell.
Figure 4:
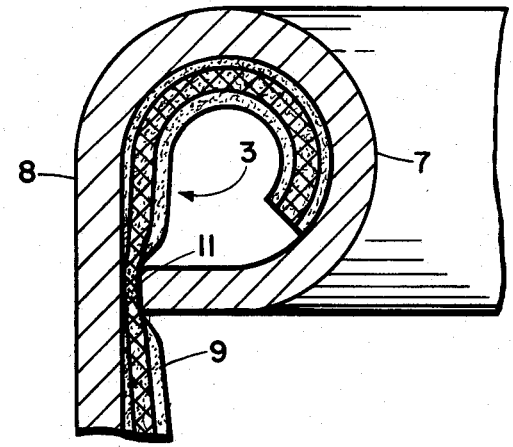
FIG. 4 is an enlarged sectioned view of the electrode extension being caught by the curling of the end of the cell container.

The spirally wound electrode structure 10 is then placed within metal cell container 6 which is then necked as shown in FIG. 3 with cathode extension 3 being adjacent the end portion 7 of the cell container 6 and slightly below the edge of said end portion. Such necking is however totally optional and dependent upon the cell container configuration desired. Jog 3 is preferably positioned in the cathode at a predetermined site such that upon such necking of cathode container 6 it is vertically adjacent end portion 7. Without necking if the cell container such jog is generally at the outer end of cathode strip 2. The end portion 7 is then curled inwardly, as part of the cell sealing procedure, and also thereby fixedly captures the cathode extension 3 by compression between the curled end 7 and the container wall 8 as shown in FIG. 4 in expanded detail. It is preferred that extension 3 be below the edge of end portion 7 and adjacent thereto in order to facilitate this "capture" of extension 3 by end portion 7 being curled therearound during the cell sealing procedures.

Since spirally wound cathodes are generally constructed with metallic substrates (generally of expanded nickel, aluminum or stainless steel in non-aqueous cells) the edge of end portion 7 preferably bites through the cathode material 9 such as carbon, manganese dioxide or other powdered material and makes positive mechanical and electrical contact with metal substrate 11, if the cathode material had not already been removed from extension 3. Though the edge of end portion 7 is shown as making such electrical contact, a tight curl may be similarly effective in both holding the cathode extension and effecting electrical contact, particularly wherein cathode material 9 was previously removed from extension 3.

Figure 5:
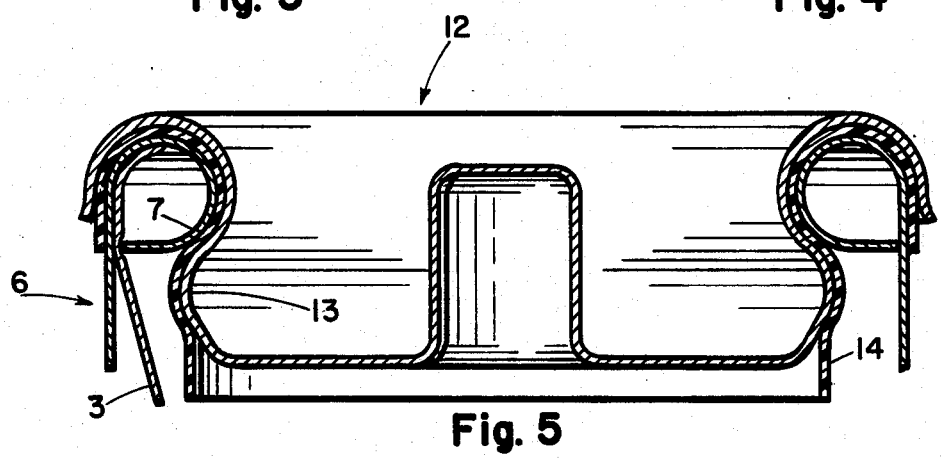
FIG. 5 is a partial sectioned elevation view of the sealed cell.

The cell container 6 is compressively sealed with container top 12 as shown in FIG. 5 with an aerosol type expanding collet crimp 13 which compresses the curled end 7 with captured cathode extension 3 to further enhance both mechanical and electrical terminal contact between the cathode and the cell container 6 which functions thereby as the cathode terminal of the cell. Container top 12 is electrically insulated from cell container 6 by sealing gasket 14 such as polytetrafluoroethylene, or other inert polyhalogenated polymers, polyolefins such as polypropylene and polyethylene, nylon, polyurethane, neoprene and the like with the particular sealing gasket material being generally determined by compatibility with cell components. The sealing gasket 14 serves the dual function in providing an hermetic seal for the cell and also the electrical insulation thereof.

Such seal provides hermeticity as particularly required for non-aqueous cell which, for the most part, have had glass to metal or ceramic seals. In an alternative embodiment of the present invention the cathode extension 3 may be entrapped as part of the seal itself if positioned between sealing gasket 14 and the curled end 7 during the sealing procedure. However, since the cathode material itself does not provide a good sealing substrate there must be sufficient residual curl-sealing gasket interface to provide the requisite sealing of the cell.

While the configuration of the electrodes in the most preferred embodiment of the present invention is the spirally wound one, the present invention is similarly applicable to any configuration having plate or layer type electrodes wherein such electrodes may have integral extensions suitable for the capture for electrical contact of the present invention.

Similarly while the electrode capture of the present invention is of greatest utility with cathodes it is equally applicable to anodes.

The present invention is applicable to cells having any electrochemical system but is most useful in non-aqueous electrochemical cells having pressurized or non-pressurized components such as $Li/SO_2$, $Li/SOCl_2$ and $Li/MnO_2$ cells wherein reduction of cost without sacrifice of contruction integrity is of increasing importance in bringing such cells to general commercial applicability.

It is understood that the embodiment described and shown in the drawings is for illustrative purposes and that changes in cell components and configuration may be made without departing from the scope of the present invention as defined in the following claims.

What is claimed is:

1. An electrochemical cell comprising a metallic cell container having spirally wound electrodes placed therewithin and being sealed with a compression seal comprised of an inwardly curled end of said container and a cell top having an outwardly curled periphery compressively held unto said inwardly curled end and separated therefrom by insulating and sealing means characterized in that one of said spirally wound electrodes has an electrically conductive extension thereof which is caught and compressively held between said inwardly curled end and said container whereby said extension is electrically connected to said container and said container becomes the external terminal for said electrode thereby.

2. The cell of claim 1 wherein said electrode having said extension is the cathode of said cell.

3. The cell of claim 1 wherein said insulating and sealing means is comprised of a material selected from the group consisting of polyhalogenated polymers, polyolefins, nylon, polyurethane and neoprene.

4. The cell of claim 2 wherein the anode of said cell is comprised of lithium.

5. The cell of claim 4 wherein said cathode is comprised of a compressed powder on a metal substrate and wherein said extension is integral with said cathode.

6. The cell of claim 5 wherein said powder is comprised of a member of the group consisting of carbon, graphite and $MnO_2$.

7. The cell of claim 6 wherein said powder is carbon and said cell contains a fluid cathode active depolarizer selected from the group consisting of $SO_2$ and $SOCl_2$.

* * * * *